United States Patent [19]

Chilcot

[11] 4,156,856
[45] May 29, 1979

[54] GAS LASERS WITH PLATINUM BLACK CATHODE

[75] Inventor: Arthur L. Chilcot, Aberlady, Scotland

[73] Assignee: Ferranti Limited, Hollinwood, England

[21] Appl. No.: 840,253

[22] Filed: Oct. 7, 1977

[30] Foreign Application Priority Data

Oct. 14, 1976 [GB] United Kingdom ............... 42649/76

[51] Int. Cl.² ............................................... H01S 3/00
[52] U.S. Cl. ......................... 331/94.5 G; 331/94.5 D; 331/94.5 PE; 331/94.5 T; 313/218
[58] Field of Search .................. 331/94.5 G, 94.5 PE, 331/94.5 P, 94.5 T, 94.5 D; 313/218

[56] References Cited
U.S. PATENT DOCUMENTS

| 3,486,058 | 12/1969 | Hernquist | 331/94.5 D |
| 3,653,960 | 4/1972 | MacNair | 331/94.5 D |
| 3,784,928 | 1/1974 | Crane | 331/94.5 D |
| 4,122,411 | 10/1978 | Fein et al. | 331/94.5 D |

Primary Examiner—William D. Larkins
Attorney, Agent, or Firm—Cameron, Kerkam, Sutton, Stowell & Stowell

[57] ABSTRACT

A gas discharge laser has a cathode electrode comprising a block of platinum black compressed into a solid mass.

5 Claims, 2 Drawing Figures

GAS LASERS WITH PLATINUM BLACK CATHODE

THIS INVENTION relates to gas lasers, and in particular to electrodes for discharge-excited gas lasers.

Many gas lasers are excited by an electric discharge struck through the gas between anode and cathode electrodes. One of the main problems with such lasers is caused by sputtering of the cathode electrode due to ion bombardment resulting from the gas discharge. Material sputtered from the cathodes becomes deposited on adjacent surfaces of the discharge vessel and in being deposited traps molecules of the gas. In addition, sputtered material may be deposited on optical surfaces such as the laser mirrors.

Many attempts have been made to reduce the sputtering problem, including sputtering shields placed over electrodes and the use of discharge paths of complex shape to reduce the deposition on vital optical surfaces. My copending application Ser. No. 840,252 discloses a cathode electrode material which has a very low sputtering rate. The use of discharge paths of complex shapes tends to lead to manufacturing problems.

It is an object of the invention to provide a gas-discharge laser having a cathode electrode which has a low sputtering rate.

According to the present invention there is provided a gas-discharge laser which includes an envelope of electrically-insulating material enclosing a longitudinal bore into which a gaseous active medium may be introduced, an anode electrode located within the envelope, and a cathode electrode located in a portion of the envelope away from but in communication with the bore and comprising a solid pellet of compressed platinum black powder.

The envelope may take the form of a thick-walled tube, the cathode electrode being located in a cavity in the wall of the tube.

Figure 1:
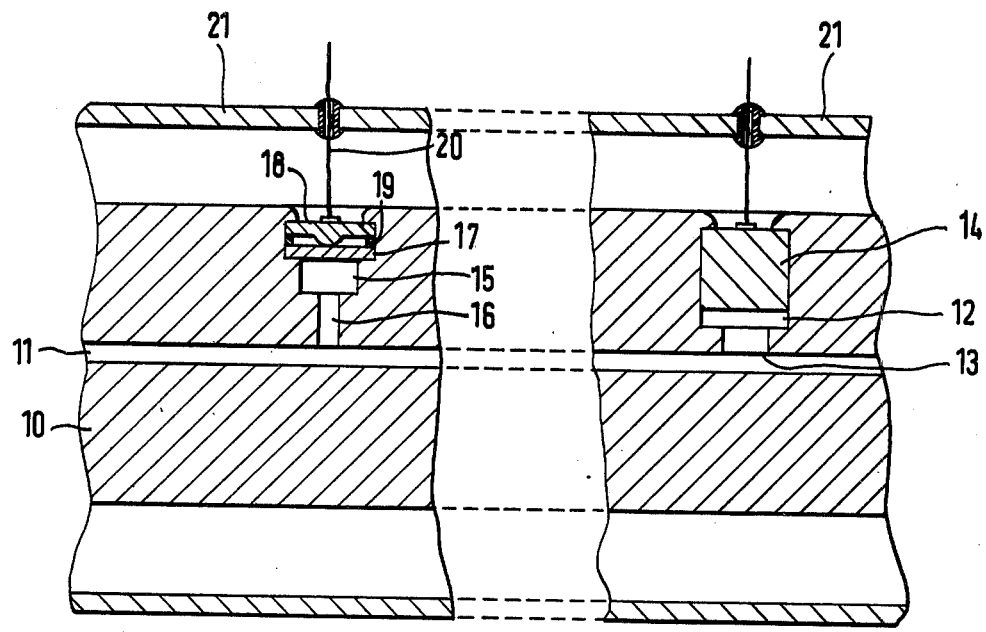
Figure 2:
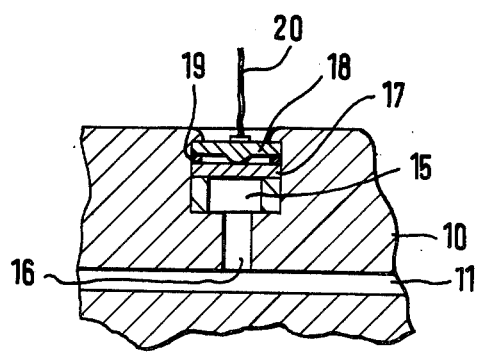

The invention will now be described with reference to the accompanying drawings, in which:

FIG. 1 shows an enlarged sectional view of part of a laser according to a first embodiment; and FIG. 2 shows a modification of part of the arrangement of FIG. 1.

Referring now to FIG. 1, the envelope of the laser is formed by a thick-walled tube 10 of electrically insulating material, such as beryllia. A longitudinal bore 11 forms the laser tube, and contains a suitable active medium. The gas discharge required to produce laser action is struck between an anode electrode and a cathode electrode. The anode electrode is located in a cavity 12 formed in the wall of the tube 10 and communicating with the main bore 11 through a passage 13. The anode electrode is formed from a block 14 of an electrically conductive material which does not react with the gas or gas mixture in the laser. Conveniently a metal such as platinum may be used. An electrical conductor is attached to the upper surface of the block 14, and the block is sealed into the tube at the outer end of the cavity.

The cathode electrode is similarly located in a second cavity 15 formed in the wall of the tube 10. This cavity 15, has two parts of different dimensions and communicates with the main bore 11 through a narrow passage 16. The cathode electrode is formed by a pellet or disc 17 of compressed platinum black powder which rests on the shoulder formed between the two parts of the cavity 15. This ensures a large exposed surface area whilst providing a trap against the passage of particles of sputtered cathode material into the main bore 11. Electrical contact is made to the cathode disc by way of a metal plate 18 sealed to the tube at the outer end of the cavity. A simple spring washer 19 is located between the disc 17 and the plate 18. A conductor 20 is soldered or otherwise secured to the metal plate 18.

The laser illustrated is enclosed in a jacket 21 through which a cooling fluid, liquid or gaseous, may be circulated. The electrical conductors pass through seals in this jacket.

The reflectors necessary to ensure laser operation are not shown in the drawing, and may take any required form. Means may be provided for adjusting the alignment of these reflectors.

The cathode disc 17, as already stated, is formed from compressed platinum black powder, using a pressure of the order of 50 tons per square inch. This produces a solid non-crumbling pellet which has been found to have a very low sputtering rate when used as a cathode in a gas discharge laser. Despite the low sputtering rate it is still preferable to incorporate a sputter trap as described above.

In operation, most material which is sputtered from the cathode will be deposited on the walls of the cavity 15. Eventually sufficient material will be deposited on these walls to become electrically connected to the cathode disc. In such a case, the sputtered material will itself form part of the cathode and will be re-sputtered, thus releasing any trapped gas.

To improve the cohesion of the platinum black particles the powder may first be heated in hydrogen at a temperature between, say, 700° C. and 900° C. for several minutes, and then cooled before compression.

The pellet may include up to 25% by weight of cupric oxide, which is mixed with the platinum black before compression into pellets, as described in the previously mentioned copending application.

FIG. 2 illustrates an alternative cathode arrangement which avoids the need to form the cavity 15 with two parts of different dimensions. In this case the cathode disc 17 is supported on a hollow tube 22 of electrically insulation material, such as a ceramic material.

A laser of the type described may well have more than one anode or cathode electrode, in which case each cathode electrode would be of the type described above.

The laser may be made with a glass envelope, in which case the cathode electrode will be located in a side-arm communicating with the main bore. The form of the cathode, and the means by which electrical contact is made to it, may be the same as described above for the thick-walled laser envelope. Alternative arrangements may be employed for both the thick and thin-walled envelopes.

What I claim is:

1. A gas discharge laser which includes an envelope of electrically-insulating material enclosing a longitudinal bore into which a gaseous active medium may be introduced, an anode electrode located in communication with the envelope, and a cathode electrode located in a portion of the envelope away from but in communication with the bore and comprising a solid pellet of compressed platinum black powder.

2. A laser as claimed in claim 1 which includes a tubular member of ceramic material on which the cathode pellet is supported.

3. A laser as claimed in claim 1 in which electrical contact is made with the cathode pellet by means of a metal plate in contact with the pellet.

4. A laser as claimed in claim 1 in which the laser envelope is in the form of a thick-walled tube having a cavity in its wall in which the cathode electrode is located.

5. A laser as claimed in claim 1 in which the cathode pellet contains up to 25% by weight of cupric oxide.

* * * * *